(12) United States Patent
Fujisawa et al.

(10) Patent No.: US 7,951,504 B2
(45) Date of Patent: May 31, 2011

(54) FUEL CARTRIDGE

(75) Inventors: Kiyoshi Fujisawa, Fujioka (JP);
Toshimi Kamitani, Fujioka (JP);
Yasunari Kabasawa, Hamura (JP);
Yugo Matsuda, Hamura (JP)

(73) Assignees: Mitsubishi Pencil Company, Limited, Shinagawa-Ku, Tokyo (JP); Casio Computer Co., Ltd., Shibuya-Ku, Tokyo (JP)

( * ) Notice: Subject to any disclaimer, the term of this patent is extended or adjusted under 35 U.S.C. 154(b) by 191 days.

(21) Appl. No.: 12/303,387

(22) PCT Filed: May 29, 2007

(86) PCT No.: PCT/JP2007/060895
§ 371 (c)(1),
(2), (4) Date: Jan. 21, 2009

(87) PCT Pub. No.: WO2007/142078
PCT Pub. Date: Dec. 13, 2007

(65) Prior Publication Data
US 2010/0012568 A1    Jan. 21, 2010

(30) Foreign Application Priority Data
Jun. 5, 2006  (JP) ................................. 2006-155840

(51) Int. Cl.
*H01M 8/04* (2006.01)
(52) U.S. Cl. ........ 429/512; 137/386; 137/395; 222/326; 429/513
(58) Field of Classification Search .................. 222/325, 222/326, 327; 429/35, 400, 512, 513, 402; 206/761, 817; 210/232; 137/392, 395–399, 386
See application file for complete search history.

(56) References Cited

U.S. PATENT DOCUMENTS
1,667,090 A * 4/1928 Wallace ........................ 417/137
(Continued)

FOREIGN PATENT DOCUMENTS
JP          59-66066 A        4/1984
(Continued)

OTHER PUBLICATIONS

Notification of Transmittal of Translation of the International Preliminary Report on Patentability (Form PCT/IB/338), International Preliminary Report on Patentability (Form PCT/IB/373), Written Opinion of the International Search Authority (Form PCT/ISA/237) mailed in corresponding International Patent Application No. PCT/JP2007/060895, Jan. 22, 2009, The International Bureau of WIPO, Geneva, CH.

(Continued)

*Primary Examiner* — Joseph W Drodge
(74) *Attorney, Agent, or Firm* — Buchanan Ingersoll & Rooney PC

(57) ABSTRACT

Provided is a fuel cartridge in which a follower is prevented from being deformed and from separating even when heavy vibration is exerted onto the fuel cartridge. The fuel cartridge is detachably connected with a fuel cell main body and assumes a construction in which the fuel cartridge is equipped with a fuel-storing vessel for storing a liquid fuel, a fuel discharge part, and a follower which seals the liquid fuel and moves as the liquid fuel is consumed at a rear end part of the liquid fuel. The follower is provided with a follower auxiliary member and a cap member both of which have no fluidity and are insoluble in the liquid fuel.

17 Claims, 11 Drawing Sheets

U.S. PATENT DOCUMENTS

| | | | | |
|---|---|---|---|---|
| 2,146,397 | A * | 2/1939 | Kommer | 137/546 |
| 2,557,438 | A * | 6/1951 | Johnson | 137/256 |
| 3,956,013 | A * | 5/1976 | Miyoshi et al. | 429/450 |
| 3,987,941 | A * | 10/1976 | Blessing | 222/386 |
| 7,615,305 | B2 * | 11/2009 | Suda et al. | 429/405 |
| 2002/0023836 | A1 * | 2/2002 | Byron et al. | 204/266 |
| 2006/0008686 | A1 * | 1/2006 | Kabasawa | 429/19 |
| 2006/0093876 | A1 * | 5/2006 | Kabasawa et al. | 429/12 |
| 2007/0259250 | A1 | 11/2007 | Osada et al. | |
| 2007/0298307 | A1 | 12/2007 | Suda et al. | |
| 2008/0311460 | A1 * | 12/2008 | Kamitani et al. | 429/35 |

FOREIGN PATENT DOCUMENTS

| | | |
|---|---|---|
| JP | 5-258760 A | 10/1993 |
| JP | 5-307970 A | 11/1993 |
| JP | 6-188008 A | 7/1994 |
| JP | 2001-102069 A | 4/2001 |
| JP | 2004-142831 A | 5/2004 |
| JP | 2005-317250 A | 11/2005 |
| JP | 2005-327538 A | 11/2005 |
| WO | WO 2005/074066 A1 | 8/2005 |
| WO | WO 2005/117184 A1 | 12/2005 |
| WO | WO 2005/122308 A1 | 12/2005 |

OTHER PUBLICATIONS

International Search Report for PCT/JP2007/060895, completed Aug. 16, 2007.

* cited by examiner

FUEL CARTRIDGE

TECHNICAL FIELD

The present invention relates to a fuel cartridge, more specifically to a fuel cartridge suited to a small-sized fuel cell used as an electric power source for portable electronic appliances such as cellular phones, note type personal computers, PDA, digital cameras and electronic databooks.

BACKGROUND ART

In general, a fuel cell comprises a cell on which an air electrode layer, an electrolyte layer and a fuel electrode layer are laminated, a fuel supplying part for supplying a fuel as a reducing agent to the fuel electrode layer and an air supplying part for supplying air as an oxidizing agent to the air electrode layer, and it is an electric cell in which electrochemical reaction takes place in the cell between a fuel and oxygen in the air to provide an electric power to the outside. Fuel cells of various types are developed.

In recent years, because of a rise in consciousness to environmental problems and energy saving, it is studied to use a fuel cell as a clean energy source for various applications. In particular, attentions have been paid to fuel cells which can generate electric power by only supplying directly a liquid fuel comprising methanol and water (refer to, for example, patent documents 1 and 2).

Among them, various liquid fuel type fuel cells making use of capillary force for supplying a liquid fuel are known (refer to, for example, patent documents 3 and 4).

Liquid fuel type fuel cells described in the above respective patent documents supply a liquid fuel from a fuel tank to a fuel electrode by virtue of capillary force, and therefore they do not require a pump for sending a liquid fuel with pressure, so that they have merits in reducing a size.

Such liquid fuel cells as merely making use of capillary force of a porous body and/or a fiber bundle disposed in a fuel reservoir are suited to reduction in a size in terms of constitution, but because a fuel is supplied directly to a fuel electrode in the form of a liquid, the fuel follows imperfectly during use over a long period of time under use environment in which it is mounted on a small-sized portable appliance and in which the direction of a fuel cell is changed very often in every direction, and the trouble that the fuel is cut off from being supplied is brought about, so that it causes inhibiting the fuel from being supplied constantly to an electrolyte layer.

On the other hand, known as one of countermeasures for solving the above defects is, for example, a fuel cell system in which a liquid fuel is introduced into a cell by virtue of capillary force and in which the liquid fuel is then vaporized in a fuel vaporizing layer and used (refer to, for example, a patent document 5). However, it has the problem that poor followability of a fuel which is a fundamental problem is not improved, and involved therein is the problem that it is difficult to reduce a size of the fuel cell having the above structure because of a system in which a liquid is vaporized and then used as a fuel.

As described above, in conventional fuel cartridges, a liquid fuel can be supplied in a stable state while maintaining followability of the fuel, and the existing situation is that reduction in a size thereof to such an extent that they can be mounted on portable appliances is strongly desired.

Patent document 1: Japanese Patent Application Laid-Open Hei 5 No. 258760 (claims, examples and others)
Patent document 2: Japanese Patent Application Laid-Open Hei 5 No. 307970 (claims, examples and others)
Patent document 3: Japanese Patent Application Laid-Open Sho 59 No. 66066 (claims, examples and others)
Patent document 4: Japanese Patent Application Laid-Open Hei 6 No. 188008 (claims, examples and others)
Patent document 5: Japanese Patent Application Laid-Open No. 2001-102069 (claims, examples and others)

DISCLOSURE OF THE INVENTION

Problems to be Solved by the Invention

In light of the problems and the existing situation in the conventional fuel cartridges described above, the present invention has been made in order to solve them, and an object thereof is to provide a fuel cartridge having excellent vibration resistance in which a liquid fuel can stably be supplied while maintaining followability of the liquid fuel, for example, even when heavy vibration is exerted onto the fuel cartridge, particularly a fuel cartridge having an excellent vibration resistance in which even when a volume of a liquid fuel is big and a cartridge diameter is large, the liquid fuel is stably supplied directly to a fuel cell main body and in which the liquid fuel is not lost in storage.

Means for Solving the Problems

Intensive studies on the conventional problems described above repeated by the present inventors have resulted in obtaining a fuel cartridge which meets the object described above, wherein it is a fuel cartridge detachably connected with a fuel cell main body and equipped with a fuel-storing vessel for storing a liquid fuel, a fuel discharge part and a follower having specific physical properties, a follower auxiliary member having a specific structure and a cap member at a rear end part of the liquid fuel, and thus the present invention has come to be completed.

That is, the present invention comprises the following items (1) to (17).

(1) A fuel cartridge detachably connected with a fuel cell main body, wherein the fuel cartridge is equipped with a fuel-storing vessel for storing a liquid fuel, a fuel discharge part and a follower which seals the liquid fuel and moves as the liquid fuel is consumed at a rear end part of the liquid fuel; and the follower is provided with a follower auxiliary member which has no fluidity and is insoluble in the liquid fuel and a cap member which has no fluidity and is insoluble in the liquid fuel.

(2) The fuel cartridge as described in the above item (1), wherein the follower auxiliary member and the cap member are connected via a connecting member.

(3) The fuel cartridge as described in the above item (1) or (2), wherein a distance between the follower auxiliary member and the cap member accounts for 50 to 200% of a diameter or a width of an inner face of the fuel-storing vessel.

(4) The fuel cartridge as described in any of the above items (1) to (3), wherein the follower comprises at least one selected from a liquid which is insoluble or slightly soluble in the liquid fuel and a gelatinous matter of the liquid.

(5) The fuel cartridge as described in the above item (4), wherein the insoluble or slightly soluble liquid comprises a non-volatile or scarcely volatile organic solvent, and the gelatinous matter of the insoluble or slightly soluble liquid comprises a gelatinous matter containing the non-volatile or slightly volatile organic solvent and a thickener.

(6) The fuel cartridge as described in the above item (5), wherein the non-volatile or slightly volatile organic solvent is at least one selected from the group consisting of polybutene, mineral oils, silicone oils and liquid paraffins.

(7) The fuel cartridge as described in the above item (5), wherein the thickener is at least one selected from the group consisting of styrene base thermoplastic elastomers, vinyl chloride base thermoplastic elastomers, olefin base thermoplastic elastomers, polyamide base thermoplastic elastomers, polyester base thermoplastic elastomers, polyurethane base thermoplastic elastomers, calcium salts of phosphoric acid esters, fine particle silica and acetalkoxyaluminum dialkylates.

(8) The fuel cartridge as described in any of the above items (1) to (7), wherein the follower auxiliary member has a cross-sectional area of 50% or more based on a cross-sectional area of the fuel-storing vessel in a diameter direction.

(9) The fuel cartridge as described in any of the above items (1) to (8), wherein the cap member has a cross-sectional area of 50% or more based on a cross-sectional area of the fuel-storing vessel in a diameter direction.

(10) The fuel cartridge as described in any of the above items (1) to (9), wherein the follower auxiliary member has a cross-sectional figure which is similar to a cross-sectional figure of the fuel-storing vessel in a diameter direction.

(11) The fuel cartridge as described in any of the above items (1) to (10), wherein the cap member has a cross-sectional figure which is similar to a cross-sectional figure of the fuel-storing vessel in a diameter direction.

(12) The fuel cartridge as described in any of the above items (1) to (11), wherein the follower auxiliary member and/or the cap member comprise any of a solid, a hollow structure and a porous body.

(13) The fuel cartridge as described in any of the above items (2) to (12), wherein the follower auxiliary member, the cap member and the connecting member comprise a material which is insoluble in the follower and the liquid fuel or a slightly volatile material.

(14) The fuel cartridge as described in any of the above items (1) to (13), wherein the cap member is provided with a through hole for installing the follower therethrough.

(15) The fuel cartridge as described in the above item (14), wherein the cap member is provided with an aperture for air release which is used for installing the follower therethrough.

(16) The fuel cartridge as described in any of the above items (1) to (15), wherein the liquid fuel is at least one selected from the group consisting of a methanol solution, an ethanol solution, dimethyl ether (DME), formic acid, hydrazine, an ammonia solution, ethylene glycol, a sodium boron hydride aqueous solution and a sucrose aqueous solution.

(17) The fuel cartridge as described in any of the above items (1) to (16), wherein a surface free energy of at least a wall face of the fuel-storing vessel which is brought into contact with the liquid fuel is controlled to a lower value than a surface free energy of the liquid fuel.

According to the present invention, provided is a fuel cartridge having excellent vibration resistance in which a liquid fuel is not lost in storage and the liquid fuel can stably be supplied to a fuel cell main body and in which even when a volume of a liquid fuel is big and a cartridge diameter is large, the liquid fuel can stably be supplied directly to the fuel cell main body.

BRIEF EXPLANATION OF THE DRAWINGS

FIG. 2 (b) is a plan view of the valve; FIG. 2 (c) is a vertical cross-sectional drawing of the valve; FIG. 2 (d) is a plan view of an adaptor; FIG. 2 (e) is a vertical cross-sectional drawing of the adaptor; FIG. 2 (f) is a plan view of a state in which the valve is installed in the adaptor; FIG. 2 (g) is a vertical cross-sectional drawing of a state in which the valve is installed in the adaptor; and FIG. 2 (h) is a vertical cross-sectional drawing of the fuel cartridge.

LIST OF REFERENCE NUMERALS AND LETTERS

Figure 1:
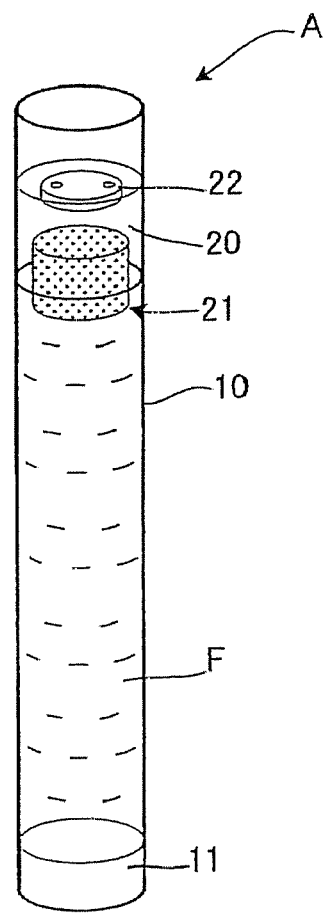
FIG. 1 (a) is an outline cross-sectional drawing showing in a vertical cross-sectional embodiment, a fuel cartridge which is one example of the embodiment according to the present invention, and FIG. 1 (b) is a plan view thereof.
Figure 1:
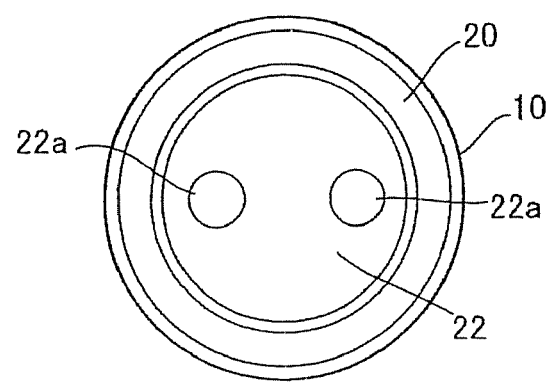

A Fuel cartridge
F Liquid fuel
10 Fuel-storing vessel
11 Fuel discharge part
12 Valve
20 Follower
21 Follower auxiliary member
22 Cap member
23 Connecting member

BEST MODE FOR CARRYING OUT THE INVENTION

The embodiments of the present invention shall be explained below in details with reference to the drawings.

Figure 2:
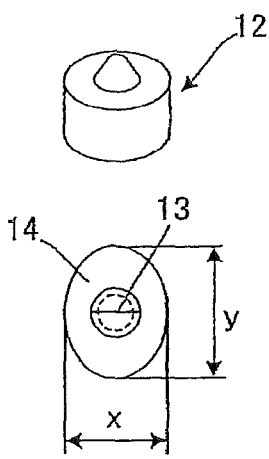
FIGS. 2 (a) to (h) show a valve structure equipped in the fuel discharge part of the first embodiment according to the present invention, wherein FIG. 2 (a) is a perspective drawing of the valve.
Figure 2:
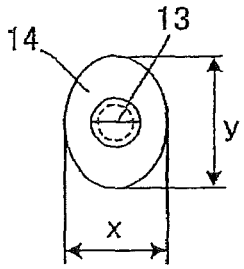
Figure 2:
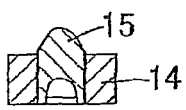
Figure 2:
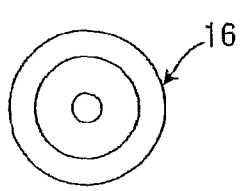
Figure 2:
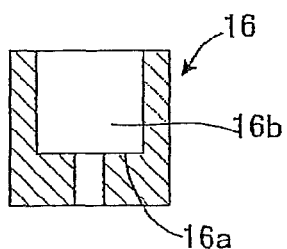
Figure 2:
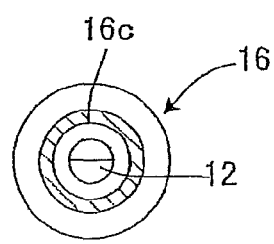
Figure 2:
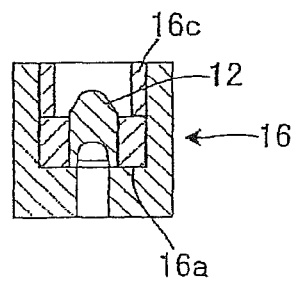
Figure 2:
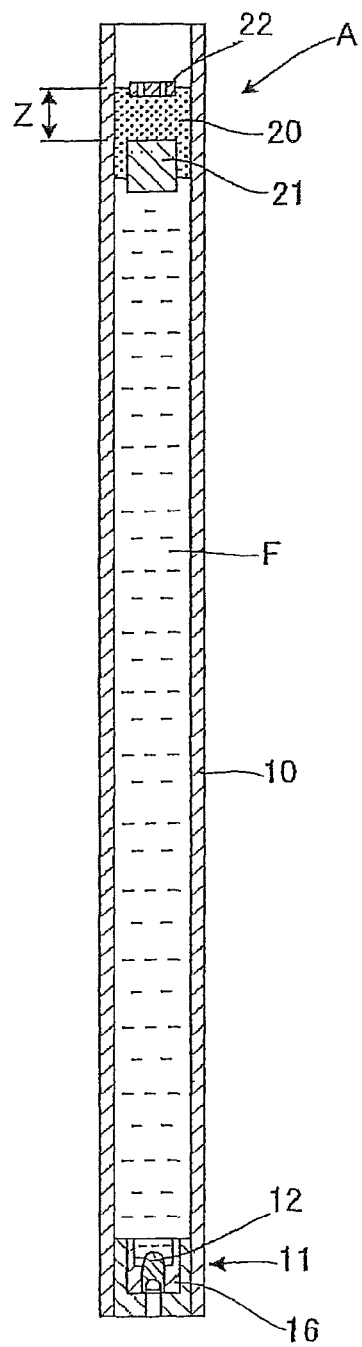

FIGS. 1 (a) and (b) to FIGS. 2 (a) to (h) show a fundamental mode (first embodiment) of a fuel cartridge A showing the fundamental embodiment of the present invention.

The fuel cartridge A of the first embodiment is detachably connected with a fuel cell main body, wherein it comprises a fuel-storing vessel 10 of a tube type for storing a liquid fuel F, a fuel discharge part 11 and a follower 20 which seals the liquid fuel and moves as the liquid fuel is consumed at a rear end part of the liquid fuel F; and the follower 20 is provided with a follower auxiliary member 21 which has no fluidity and is solid and which is insoluble in the liquid fuel and a cap member 22 which has no fluidity and is solid and which insoluble in the liquid fuel.

The fuel-storing vessel 10 of the tube type described above is preferably constituted of a material having storage stability and durability against a liquid fuel stored therein, gas non-permeability (gas non-permeability against oxygen gas, nitrogen gas and the like) and light transmittance so that a remaining amount of the liquid fuel can visually be observed from the outside.

The material of the fuel-storing vessel 10 includes, for example, metals such as aluminum and stainless steel, non-transmittable, for example, colored synthetic resins and glass when light transmittance is not required, and from the viewpoints of visibility of the remaining amount of the liquid fuel described above, gas non-permeability, reduction in a cost in producing and assembling and easiness of production, the fuel storing-vessel is preferably constituted of a single layer structure comprising a single kind or two or more kinds of resins or a multilayer structure of plural layers including one or more layers comprising at least one of resins such as polypropylene, polyvinyl alcohol, ethylene-vinyl alcohol copolymer resins, polyacrylonitrile, nylon, cellophane, polyethylene terephthalate, polycarbonate, polystyrene, polyvinylidene chloride, polyvinyl chloride and the like each having the respective characteristics described above. In the case of the multilayer structure, as long as at least one layer is constituted of a resin having the performances described above (gas permeability), problems in terms of actual use are not involved therein even if the remaining layers are constituted of conventional resins which are not described above. Such tubes having a multilayer structure can be produced by extrusion molding, injection molding and co-extrusion molding.

A size of the fuel-storing vessel 10 of the tube type described above shall not specifically be restricted, and it can be an inner diameter of 5 to 50 mm and a length of 30 to 200 mm. Further, the inner diameter may be 10 to 50 mm.

The fuel discharge part 11 is equipped with a valve 12 for sealing communication of the inside of the tubular fuel-storing vessel 10 with the outside thereof, and a structure in which the valve 12 is installed in the fuel discharge part 11 directly or via a valve adaptor is assumed in the present embodiment. The above valve 12 assumes the same structure as that of a member used in writing instruments, and it prevents, as shown in FIGS. 2 (a) to (c), foreign matters such as air from coming in the liquid fuel F stored directly in the fuel-storing vessel 10 from the periphery of a fuel-supplying tube described later.

The above valve 12 allows the fuel-storing vessel 10 to be communicated between the inside and the outside thereof by inserting a liquid fuel supplying member, and it is provided with a communicating part 13 comprising a linear slit for supplying the liquid fuel F in the inside of the fuel-storing vessel 10 to the outside and a valve outer edge part 14 surrounding a periphery of the communicating part 13. When the valve 12 is installed in the fuel discharge part 11 or the valve adaptor 16, the valve 12 is compressed from a periphery of the valve outer edge part 14 to a diameter direction, whereby compressing force works on the communicating part 13 described above. In the present embodiment, the valve is elliptic as shown in FIG. 2 (b); a slit 13 which is a communicating part is provided in a minor axis direction x; when a stress in a direction different from the minor axis direction x, for example, a stress in a major axis direction y orthogonal to the minor axis direction x is applied to the valve 12, the outer edge part 14 is compressed, and thus the stress works in a direction in which the slit 13 is closed.

The communicating part 13 described above is formed by a linear slit, and it shall not specifically be restricted as long as it assumes a structure in which the fuel-storing vessel 10 can be communicated between the inside and the outside thereof by inserting a liquid fuel supplying member to supply the liquid fuel F stored in the fuel-storing vessel 10 to the outside. It may be a cross-shaped or radial slit, a structure in which plural slits are formed and in which the respective slits are crossed in the same spot, a circular hole shape or a rectangular hole shape. It is preferably the linear slit described above. The shape of the outer edge part 14 shall not specifically be restricted, and it can be formed in a circular shape as well as an elliptical shape as is the case with the embodiment described above.

A convex tapered face (projection) 15 is preferably formed on the inner face side of the valve 12 toward the inside of the fuel-storing vessel 10 so that the liquid fuel supplying member can smoothly be inserted when inserting it, and the communicating part 13 is particularly preferably provided in the tapered face 15.

The fuel discharge part 11 described above is equipped with such an adaptor 16 as shown in FIGS. 2 (d) and (e), and the adaptor 16 is formed in a cylindrical shape and comprises a main body part 16b in which stopper parts 16a are formed on an inner peripheral face and a fixing member 16c which is formed in a cylindrical shape. The valve 12 having the construction described above is interposed between the stopper part 16a and the fixing member 16c.

The combination of the valve 12 and the adaptor 16 includes a case of an elliptical slit valve and a circular adaptor as shown in FIGS. 2 (a) to (h), and in reverse, it may be a case of a circular slit valve and an elliptical adaptor. In the latter case, a slit direction of the slit valve has to be consistent with a major axis of the adaptor.

The valve 12 having the structure described above assumes a structure in which foreign matters such as air are prevented from coming in during suspending use (no use) thereof. This is to prevent troubles such as leaking and spouting of the fuel caused by increase in a pressure of the liquid fuel-storing vessel 10 which is brought about by coming in of air.

The valve 12 and the adaptor 16 are preferably, from the viewpoint of preventing more effectively leaking of the liquid fuel, those which have the structures described above and comprise materials having a low gas permeability toward the liquid fuel F and which are constituted of materials having a compression set factor of 20% or less prescribed in JIS K 6262-1997.

The materials for the above valve 12 and adaptor 16 shall not specifically be restricted as long as they have storage stability, durability against the liquid fuel F stored and gas non-permeability and elasticity by which the valve can be fixed tightly to the fuel-supplying tube and have the characteristics described above. They include synthetic resins such as polyvinyl alcohol, ethylene-vinyl alcohol copolymer resins, polyacrylonitrile, nylon, cellophane, polyethylene terephthalate, polycarbonate, polystyrene, polyvinylidene chloride, polyvinyl chloride and the like, rubbers such as natural rubber, isoprene rubber, butadiene rubber, acrylonitrile butadiene rubber, 1,2-polybtutadiene rubber, styrene-butadiene rubber, chloroprene rubber, nitrile rubber, butyl rubber, ethylene-propylene rubber, chlorosulfonated polyethylene rubber, acryl rubber, epichlorohydrin rubber, polysulfide rubber, silicone rubber, fluorocarbon rubber, urethane rubber and the like and thermoplastic elastomers. They can be produced by conventional injection molding, vulcanizing molding and the like.

The liquid fuel F used includes a methanol solution comprising methanol and water, but the liquid fuel shall not specifically be restricted as long as hydrogen ions ($H^+$) and electrons ($e^-$) are efficiently obtained from a compound supplied as fuel at a fuel electrode body described later. Liquid fuels such as dimethyl ether (DME), an ethanol solution, formic acid, hydrazine, an ammonia solution, ethylene glycol, a sodium boron hydride aqueous solution, a sucrose aqueous solution can be used as well, though depending on the structure of the fuel electrode body.

The above liquid fuels having various concentrations can be used according to the structure and the characteristics of the fuel cell, and the liquid fuels having a concentration of, for example, 1 to 100% can be used.

The follower 20 is brought into contact with a rear end part of the liquid fuel F stored in the fuel-storing vessel 10 to seal the liquid fuel F, and it moves as the rear end of the liquid fuel F moving by supplying the liquid fuel F in the fuel-storing vessel 10 from the fuel discharge part 11 to the fuel cell moves. It prevents the liquid fuel F in the fuel-storing vessel 10 from leaking and vaporizing from a reverse side of the fuel discharge part 11 in the fuel-storing vessel 10, that is, a follower 20 side, and it prevents air from coming in the liquid fuel.

The above follower 20 is required not to be dissolved or diffused in the liquid fuel F. If it is dissolved or diffused in the liquid fuel F, it is considered that the liquid fuel in the fuel-storing vessel 10 which is a fuel storing tank leaks and vaporizes and that not only the fuel-storing vessel does not play a role as a fuel storing tank, but also a substance constituting the follower 20 comes into the fuel electrode of the fuel cell main body together with the liquid fuel F to exert an adverse effect on the reaction. The preferred characteristics of the follower 20 used in the present invention are selected taking these conditions into consideration.

The follower 20 which can be used comprises preferably a liquid which is insoluble or slightly soluble in the liquid fuel F or a gelatinous matter of the liquid, and the follower has preferably a specific gravity of 90 to 200% based on a specific gravity of the liquid fuel F.

The insoluble or slightly soluble liquid includes, for example, at least one selected from the group consisting of non-volatile or slightly volatile organic solvents such as polybutene, mineral oils, poly glycols, polyesters, silicone oils, liquid paraffins.

The polybutene which can be used includes, for example, Nissan Polybutene N (manufactured by NOF Corporation), LV-7, LV-10. LV-25, LX-50, LV-100, HV-15, HV-35, HV-50, HV-100, HV-300, HV-1900 and HV-3000 (all manufactured by Nippon Petrochemicals Co., Ltd.) and 35R (manufactured by Idemitsu Kosan Co., Ltd.) which are commercially available products. The mineral oils include, for example, Diana Process Oil MC-W90, PS-430 and PS-90 (all manufactured by Idemitsu Kosan Co., Ltd.) which are commercially available products.

The silicone oils include, for example, KF-96 0.65 to 30,000 (all manufactured by Shi-Etsu Silicones Co., Ltd.).

The above non-volatile or slightly volatile organic solvents can be used alone or in combination of two or more kinds thereof.

The gelatinous matter of the insoluble or slightly soluble liquid is constituted from a matter containing the non-volatile or slightly volatile organic solvent described above and a thickener.

The thickener used may be any one as long as it is soluble or swollen in the non-volatile or slightly volatile organic solvents described above and can turn the insoluble or slightly soluble liquid into a gelatinous matter. Capable of being used is, for example, at least one selected from the group consisting of styrene base thermoplastic elastomers, vinyl chloride base thermoplastic elastomers, olefin base thermoplastic elastomers, polyamide base thermoplastic elastomers, polyester base thermoplastic elastomers, polyurethane base thermoplastic elastomers, calcium salts of phosphoric acid esters, fine particle silica, acetalkoxyaluminum dialkylates, fatty acid metal salts and modified clay.

The styrene base thermoplastic elastomer (SBC) is a thermoplastic elastomer (TPE) which has a polystyrene block and a rubber intermediate block and in which a polystyrene part forms physical cross-linkage (domain) to become a cross-linking point and the rubber intermediate block provides the products with a rubber elasticity, and capable of being used are a linear type or a radial type of TPE such as S-B-S, S-I-S, S-EB-S, S-EP-S and V-SI-S according to combinations of polystyrene (S) which is a hard segment with polybutadiene (B), polyisoprene (I), ethylene-butylene (EB), ethylene-propylene (EP) and vinyl-polyisoprene (V-I) which are soft segments, and hydrogenated matters thereof.

The vinyl chloride base thermoplastic elastomer (TPVC) which can be used is TPE in which PVC, NBR and the like are used for a hard segment and in which PVC is used for a soft segment, and the olefin base thermoplastic elastomer (TPO) is TPE in which polyolefin such as polypropylene, polyethylene and the like is used for a hard segment and in which EPDM are used for a soft segment.

The polyamide base thermoplastic elastomer (TPAE) which can be used is a block copolymer in which nylon is used for a hard segment and in which polyester or polyol (PTMG or PPG) is used for a soft segment; the polyester base thermoplastic elastomer (TPEE) is a multiblock polymer in which high crystalline aromatic polyester having a high melting point, for example, polybutylene terephthalate (PBT) is used for a hard segment and in which amorphous polyether having a low glass transition temperature (for example, −70° C. or lower), for example, polytetramethylene ether glycol (PTMG) is used for a soft segment and TPE of a type in which aliphatic polyester is used for a soft segment; and the polyurethane base thermoplastic elastomer (TPU) includes an incompletely plasticized type having partial cross-linkage in a molecule and a complete thermoplastic type comprising a completely linear polymer, wherein a polymer chain comprising diisocyanate and short chain glycol is a hard segment, and a polymer chain comprising diisocyanate and polyol is a soft segment. Various polymers can be formed according to the kinds and the amounts of diisocyanate and long and short chain polyols, and a caprolactone type, an adipic acid type and a polytetramethylene glycol type [a PTMG type (or an ether type)] can be used.

Hydrophobic silica and the like (Aerosil R-974D manufactured by Nippon Aerosil Co., Ltd. as a commercially available product) can be used as the fine particle silica.

The above thickeners can be used alone or in combination of two or more kinds thereof.

The follower comprising the gelatinous matter containing the above non-volatile or slightly volatile organic solvent and the thickener comprises 70 to 99.8% by weight (hereinafter referred to merely as [%]), preferably 85 to 99.5% and more preferably 87 to 99.5% of the non-volatile or slightly volatile organic solvent and 0.2 to 30%, preferably 0.5 to 15% and more preferably 0.5 to 10% of the thickener each based on the total amount of the follower.

The follower 20 which can be used comprises, as described above, an insoluble or slightly soluble liquid or a gelatinous matter of the liquid, preferably the gelatinous matter of the liquid from the viewpoint of having good followability and stably supplying a liquid fuel even when a cartridge diameter is large, and the follower has preferably a specific gravity of 90 to 200%, more preferably 95 to 150% based on a specific gravity of the liquid fuel F from the viewpoint of allowing the follower to efficiently follow as the fuel is consumes.

In the present invention, a specific gravity of the follower is varied according to the kind and the concentration of the liquid fuel used. That is, and the specific gravities of the respective liquid fuels used at some concentrations are shown in the following Table 1.

TABLE 1

| Specific gravities of the respective liquid fuels | |
|---|---|
| Kind of liquid fuel | Specific gravity |
| Methanol | 0.79 |
| Ethanol | 0.79 |
| Dimethyl ether | 0.661 |
| Formic acid | 1.241 |
| Hydrazine | 1.00 |
| Aqueous ammonia (concentration 25%) | About 1.00 |
| Ethylene glycol | 1.10 |
| Sodium boron hydride aqueous solution (concentration 5%) | 1.05 |
| Sucrose aqueous solution (concentration 10%) | 1.00 |

TABLE 1-continued

| Concentration and specific gravity of methanol | |
|---|---|
| Methanol concentration (wt %) | Specific gravity |
| 0 | 0.998 |
| 10 | 0.982 |
| 20 | 0.967 |
| 30 | 0.952 |
| 40 | 0.935 |
| 50 | 0.916 |
| 60 | 0.895 |
| 70 | 0.872 |
| 80 | 0.847 |
| 90 | 0.820 |
| 100 | 0.792 |

In the present invention, when 70% methanol solution (specific gravity: 0.872) is used as the liquid fuel F, a specific gravity of the follower comprising the insoluble or slightly soluble liquid or the gelatinous matter of the liquid is preferably 0.785 to 1.744, more preferably 0.785 to 1.308, and when DME (specific gravity: 0.661) is used as the liquid fuel F, a specific gravity of the follower is preferably 0.595 to 1.322, more preferably 0.595 to 0.9915.

In the present invention, the liquid fuel used for the fuel cell has a small specific gravity (most of them have 1 or less), and therefore the follower used falling in a preferred range of the specific gravity can be prepared by suitably combining the kind and a use amount of the insoluble or slightly soluble liquid described above and the kind and a use amount of the thickener and the production process thereof.

A use amount of the follower having the constitution described above has to be determined from the viewpoints of good followability and impact resistance in falling, and it is preferably 0.01 to 0.5 time, more preferably 0.1 to 0.2 time based on a filling amount (weight ratio) of the liquid fuel F used. For example, when the storing vessel is charged with 2 ml of a 70% methanol solution as the liquid fuel F, an amount of the follower is preferably 0.2 to 0.4 ml.

The follower auxiliary member 21 used in the present invention is a solid having no fluidity and is insoluble in the liquid fuel, and it is inserted into the follower 20.

The follower auxiliary member 21 is installed in order to allow the follower 20 to follow well without causing discontinuity of following even when the fuel is consumed at a large speed or the fuel-storing vessel of a tube type has a large diameter so as to load a large amount of the liquid fuel. Further, it is used together with a cap member 22 described later in order to prevent the follower 20 from being deformed or separating from a rear end of the liquid fuel F even when heavy vibration is applied to the fuel cartridge to stably supply the liquid fuel directly to the fuel cell main body.

The material for the follower auxiliary member 21 includes, for example, polypropylene, ethylene.vinyl alcohol copolymer resins, polyacrylonitrile, nylon, polyethylene terephthalate, polycarbonate, polystyrene, polyvinylidene chloride, polyvinyl chloride and various rubbers, and solids comprising the above materials or hollow structures thereof and porous bodies can preferably be used. In the present embodiment, a porous matter is used, though not illustrated.

The shape of the follower auxiliary member 21 includes a cylindrical shape, a quadrangular prism shape, a triangular prism shape, a spherical shape and the like, and it is preferably a shape similar to a cross section of the fuel cartridge from the viewpoint of further exhibiting the effects of the present invention. An entire length (height) thereof accounts preferably for 30 to 70% based on the entire length of the follower 20.

The follower auxiliary member 21 used has preferably a cross-sectional area of 50% or more, more preferably 80 to 95% based on a cross-sectional area of the fuel-storing vessel 10 in a diameter direction thereof from the viewpoint of exhibiting good followability when the fuel is consumed at a large speed or a diameter of the fuel-storing vessel has a large diameter so as to load a large amount of the liquid fuel. The follower auxiliary member 21 may stay in a state in which it is inserted into the follower 20 comprising an insoluble or slightly soluble liquid or a gelatinous matter of the liquid or a part of the follower auxiliary member 23 is projected from the bottom of the follower 20 comprising an insoluble or slightly soluble liquid or a gelatinous matter of the liquid.

Further, in the present embodiment, the fuel-storing vessel 10 has an inner diameter of 6.0 mm, an outer diameter of 8.0 mm and a length of 100 mm; the liquid fuel F is a 70% methanol solution (specific gravity: 0.872); the follower 20 comprises a gelatinous matter (specific gravity: 1.0) of an insoluble or slightly soluble liquid; the follower auxiliary member 21 is made of polypropylene and has an apparent specific gravity (weight/volume, hereinafter the same shall apply) of 0.5; a length (height) thereof accounts for 70% based on the entire length of the follower 20; a diameter is 5 mm; and a cross-sectional area accounts for 70% based on a cross-sectional area of the fuel-storing vessel 10 in a diameter direction thereof.

The cap member 22 used in the present invention is a solid having no fluidity and is insoluble in the liquid fuel, and it is disposed on an upper face of the follower 20 as a cap for the follower 20.

The cap member 22 is used in order to prevent the follower 20 from being deformed or separating even when heavy vibration is applied to the fuel cartridge by assuming a constitution in which the follower 20 is interposed between the cap member 22 and the follower auxiliary member 21 to stably supply the liquid directly to the fuel cell main body.

Matters constituted of the same various resins and rubbers as used for the follower auxiliary member 21 described above, preferably solids comprising the above materials or hollow structures thereof and porous bodies can be used as the material for the cap member 22. In the present embodiment, the cap member 22 is constituted as well, though not illustrated, of a porous body as is the case with the follower auxiliary member 21 described above.

The shape of the cap member 22 includes a cylindrical shape, a quadrangular prism shape, a triangular prism shape, a spherical shape and the like, and it is preferably a shape similar to a cross section of the fuel cartridge from the viewpoint of further exhibiting the effects of the present invention.

The cap member 22 used has preferably a cross-sectional area of 50% or more, more preferably 80 to 95% based on a cross-sectional area of the fuel-storing vessel 10 in a diameter direction thereof from the viewpoints of exhibiting good followability when the fuel is consumed at a large speed or a diameter of the fuel-storing vessel has a large so as to load a large amount of the liquid fuel and preventing the follower 20 from being deformed or separating even when heavy vibration is applied to the fuel cartridge. The cap member 22 may stay in a state in which it is inserted into the follower 20 comprising an insoluble or slightly soluble liquid or a gelatinous matter of the above liquid or a part of cap member 22 is projected over the follower 20 comprising an insoluble or slightly soluble liquid or a gelatinous matter of the above liquid.

Further, a distance Z between the cap member 22 and the follower auxiliary member 21 accounts preferably for 50 to 200% of an inner diameter or width of the fuel-storing vessel 10 from the viewpoints that the followability can not be secured if the distance is too small and that the fuel is less loaded by the corresponding distance if it is too large. Also, the entire length (height) of the distance Z accounts preferably for 50 to 90% based on the entire length of the follower 20.

Further, in the present embodiment, the cap member 22 is provided with a through hole 22a for installing the follower 20 therethrough.

In the present embodiment, the fuel-storing vessel has an inner diameter of 6.0 mm, an outer diameter of 8.0 mm and a length of 100 mm; the liquid fuel F is a 70% methanol solution (specific gravity: 0.872); the follower 20 comprises a gelatinous matter (specific gravity: 1.0) of an insoluble or slightly soluble liquid; the cap member 22 is made of polypropylene and has an apparent specific gravity of 0.5 to 1.0; a diameter thereof is 5 mm; a cross-sectional area accounts for 70% based on a cross-sectional area of the fuel-storing vessel 10 in a diameter direction thereof; and the through hole has a diameter of 1 mm. Further, a distance between the cap member 22 and the follower auxiliary member 21 is 3 mm.

Figure 3:
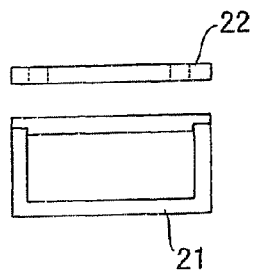
FIGS. 3 (a) to (c) are a lateral cross-sectional drawing, a plan view and a perspective drawing which show another embodiment of the follower auxiliary member and the cap member.
Figure 3:
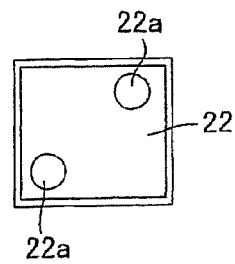
Figure 3:
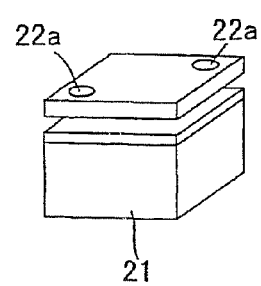
Figure 4:
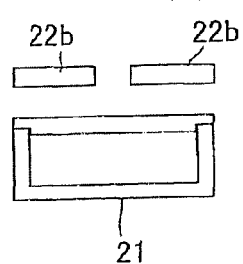
FIGS. 4 (a) to (c) are a lateral cross-sectional drawing, a plan view and a perspective drawing which show another embodiment of the follower auxiliary member and the cap member.
Figure 4:
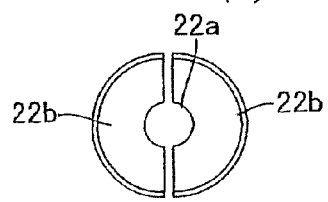
Figure 4:
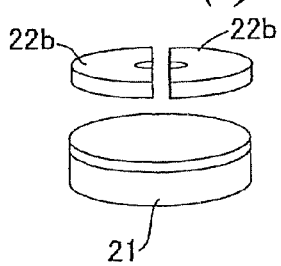
Figure 5:
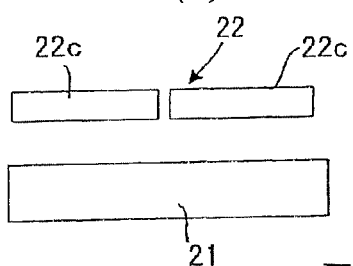
FIGS. 5 (a) to (c) are a front view, a plan view and a perspective drawing which show another embodiment of the follower auxiliary member and the cap member.
Figure 5:
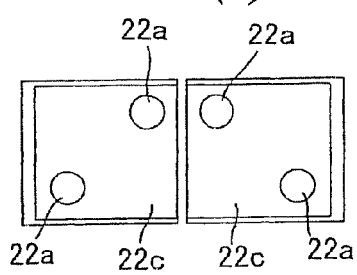
Figure 5:
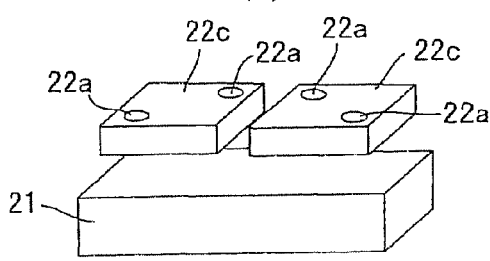
Figure 6:
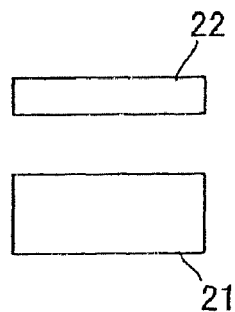
FIGS. 6 (a) to (c) are a front view, a plan view and a perspective drawing which show another embodiment of the follower auxiliary member and the cap member.
Figure 6:
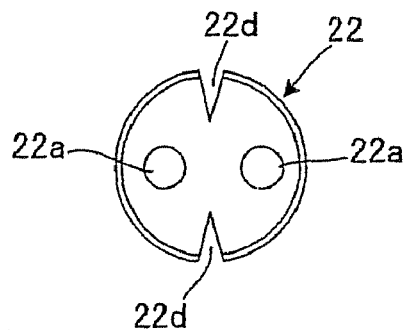
Figure 6:
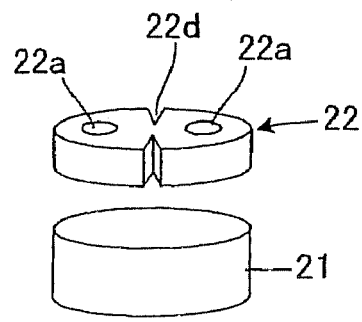
Figure 7:
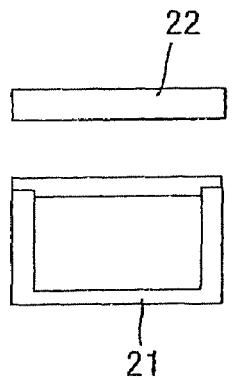
FIGS. 7 (a) to (c) are a lateral cross-sectional drawing, a plan view and a perspective drawing which show another embodiment of the follower auxiliary member and the cap member.
Figure 7:
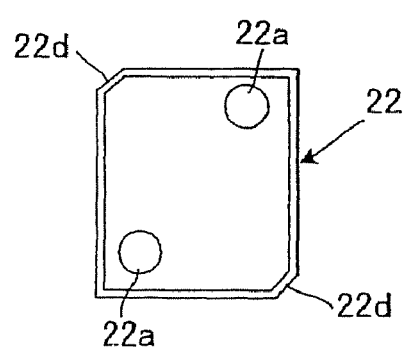
Figure 7:
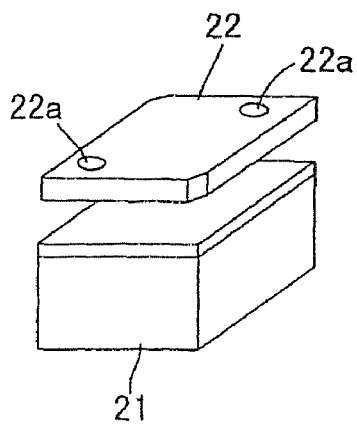

FIGS. 3 (a) to (c) to FIGS. 7 (a) to (c) show various constitutions of the follower auxiliary member 21 and the cap member 22 which are another embodiments, wherein FIG. 3 (a), FIG. 4 (a), FIG. 5 (a), FIG. 6 (a) and FIG. 7 (a) are a front view (lateral cross-sectional drawings in FIG. 3 (a), FIG. 4 (a) and FIG. 7 (a)); FIG. 3 (b), FIG. 4 (b), FIG. 5 (b), FIG. 6 (b) and FIG. 7 (b) are a plan view; and FIG. 3 (c), FIG. 4 (c), FIG. 5 (c), FIG. 6 (c) and FIG. 7 (c) are a perspective drawing.

The same constitutions as those of the follower auxiliary member 21 and the cap member 22 shown in FIGS. 1 (a) and (b) and FIGS. 2 (a) to (h) shall be shown by the same reference numerals to omit explanations thereof. The shape of the fuel cartridge (storing vessel 10) used is similar to the cross-sectional figures of the follower auxiliary member 21 and the cap member 22.

In FIGS. 3 (a) to (c), the outline shapes of the follower auxiliary member 21 and the cap member 22 are set to a square figure. In FIGS. 4 (a) to (c), a circular cap member 22 is divided into two parts, and cap pieces 22b divided into two parts are disposed a little apart and set to a circular shape in use. This embodiment assumes a constitution in which a through hole 22a for installing the follower therethrough is formed in the center of the cap member 22. The material of the follower auxiliary member 21 in FIGS. 3 (a) to (c) and FIGS. 4 (a) to (c) assumes a hollow structure.

In FIGS. 5 (a) to (c), the shapes of the follower auxiliary member 21 and the cap member 22 are set to a rectangular figure. The cap member 22 comprises cap pieces 22c obtained by dividing the rectangular figure into two parts, and the cap pieces 22c divided into two parts are disposed a little apart and set to a rectangular figure in use. This embodiment assumes a constitution in which through holes 22a are formed in the respective cap pieces 22c. The follower auxiliary member 21 and the cap member 22 in FIGS. 5 (a) to (c) are constituted of a material comprising a porous body (not illustrated).

In FIGS. 6 (a) to (c), the shapes of the follower auxiliary member 21 and the cap member 22 are set to a circular figure, and assumed is a constitution in which through holes 22a for installing the follower therethrough are formed in the cap member 22 and in which apertures (including ventilation holes and slits) 22d for air release provided in order to more smoothly install the follower 20 are formed in a peripheral part thereof. The follower auxiliary member 21 and the cap member 22 in FIGS. 6 (a) to (c) are constituted of a material comprising a porous body (not illustrated).

In FIGS. 7 (a) to (c), the shapes of the follower auxiliary member 21 and the cap member 22 are set to a square figure, and assumed is a constitution in which through holes 22a for installing the follower therethrough are formed in the cap member 22 and in which apertures (including ventilation holes and slits) 22d for air release provided in order to more smoothly install the follower 20 are formed at two corner parts thereof. The follower auxiliary member 21 in FIGS. 7 (a) to (c) assumes a hollow structure.

The fuel cartridge A constituted in the manner described above can be produced by the following process; as shown in, for example, FIGS. 1 (a) and (b) and FIGS. 2 (a) to (h), the fuel discharge part 11 having the valve 12 is disposed at a lower part of the fuel-storing vessel 10 of a tube type; subsequently, the fuel-storing vessel is loaded with a prescribed amount of the liquid fuel from an aperture part thereof at an upper end; the follower auxiliary member 21, the follower 20 and the cap member 22 are inserted thereinto; and then force of 300 G is applied to a valve direction for 10 minutes by means of a centrifuge.

The fuel cartridge A constituted in the manner described above is detachably connected, as shown in FIG. 8 and FIGS. 9 (a) and (b), with the fuel cell main body N and used. The fuel cell main body shall not be restricted to the following embodiments.

Figure 8:
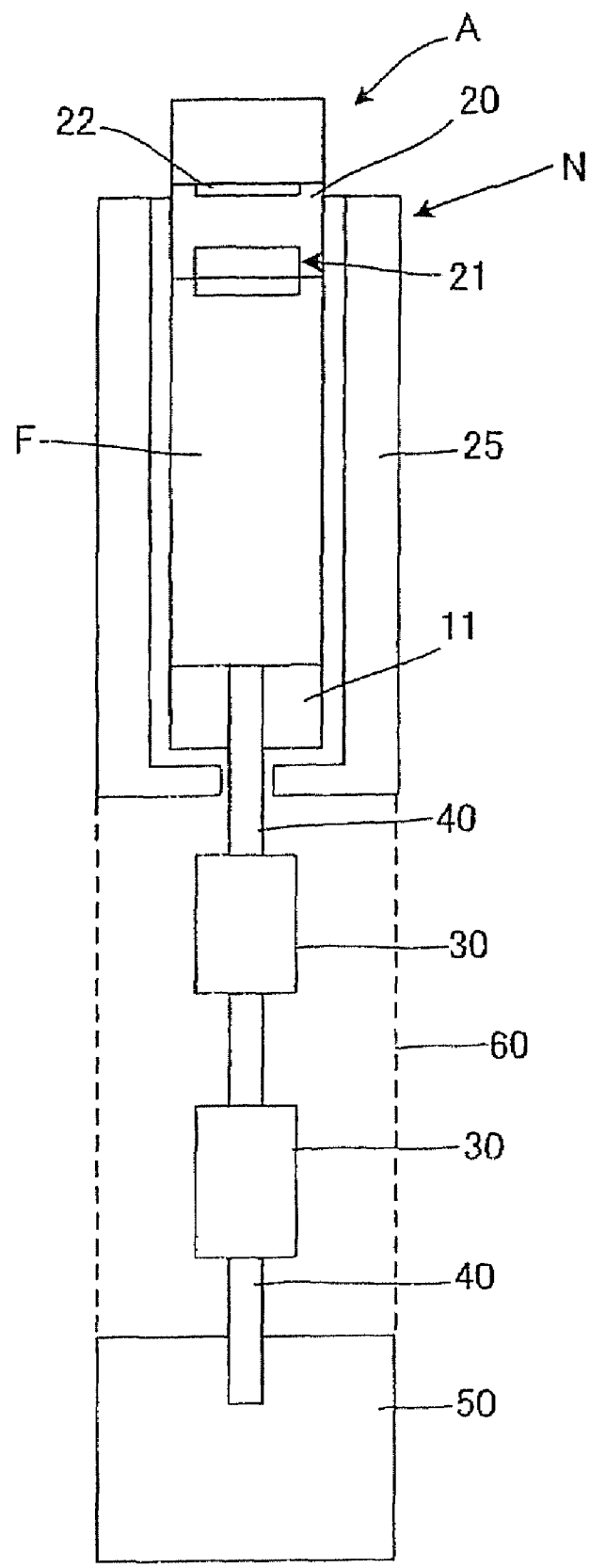
FIG. 8 is an outline cross-sectional drawing showing one example of a state in which the fuel cartridge of FIG. 1 (a) is connected with a fuel cell main body and used as a fuel cell.
Figure 9:
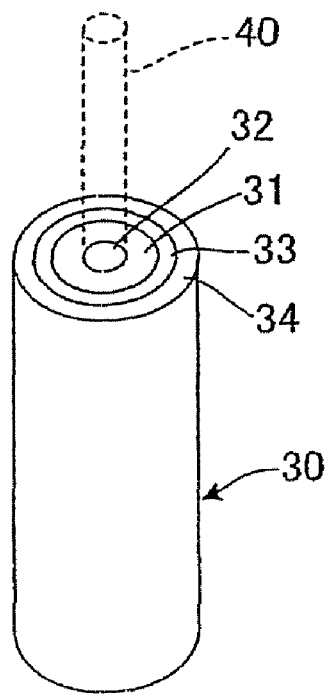
FIGS. 9 (a) and (b) are a perspective drawing and a vertical cross-sectional drawing which explain a cell.
Figure 9:
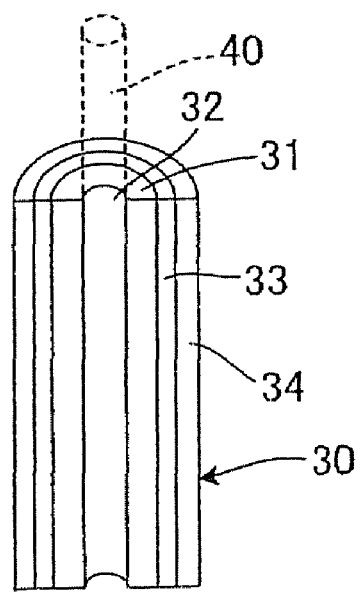

The fuel cell main body N of the embodiment is equipped, as shown in FIG. 8 and FIGS. 9 (a) and (b), with unit cells (fuel-cell unit cells) 30 formed by constructing an electrolyte layer 33 on the outer surface of a fuel electrode body 31 comprising a fine porous carbonaceous body and constructing an air electrode layer 34 on the outer surface of the electrolyte layer 33, a fuel supplying member 40 connected with the fuel reservoir A and having a penetrating structure and a used-fuel storing tank 50 provided at an end of the fuel supplying member 40. The fuel cell main body assumes a structure in which the respective unit cells 30 described above are joined in series and in which the fuel is supplied in order by means of the fuel supplying member 40. The fuel cartridge A described above comprises an exchangeable cartridge structure and assumes a constitution in which it is inserted into a supporter 25 for the fuel cell main body B.

In the embodiment, the liquid fuel F is directly stored as shown in FIGS. 1 (a) and (b) to FIGS. 2 (a) to (h), and the liquid fuel is supplied by means of the fuel supplying member 40 inserted into the valve 12 of the fuel discharge part 11 disposed at a lower part of the fuel-storing vessel 10 for storing the liquid fuel F.

The fuel-storing vessel 10, the fuel discharge part 11 and the fuel supplying member 40 in the fuel reservoir A are to be connected respectively by engaging. In this case, if the respective members have a higher surface free energy than that of the liquid fuel F, the liquid fuel is liable to get into gaps of junctions, and the possibility that the liquid fuel F leaks is heightened. Accordingly, a surface free energy of the above members is preferably controlled to a lower level than that of the liquid fuel F at least on a wall surface brought into contact with the liquid fuel F. In respect to a method for controlling the surface free energy, a wall surface of the fuel-storing vessel 10 which is brought into contact with the liquid fuel can be subjected to water repellent film-forming treatment by coating a water repellent agent of a silicone resin or a fluorine base.

The respective unit cells 30 have, as shown in FIGS. 9 (a) and (b), the fuel electrode body 31 comprising a fine porous carbonaceous pillar body and in addition thereto, have a through part 32 in a central part thereof through which the fuel supplying member 40 passes, and they assume a structure in which the electrolyte layer 33 is constructed on the outer surface of the fuel electrode body 31 described above and in which the air electrode layer 34 is constructed on the outer surface of the electrolyte layer 33. The respective unit cells 30 generate an electromotive force of about 1.2 V per cell in theory.

The fine porous carbonaceous pillar body constituting the above fuel electrode body 31 may be any ones as long as they are a porous structure having fine communication holes, and it includes, for example, carbon composite molded articles which comprise a three-dimensional network structure or a point sintered structure and which are constituted of amorphous carbon and carbon powder, isotropic high density carbon molded articles, carbon fiber paper-making molded articles and activated carbon molded articles, and the carbon composite molded articles which comprise amorphous carbon and carbon powder and which have fine communication holes are preferred from the viewpoints of easiness in controlling reaction in the fuel electrode of the fuel cell and a further rise in the reaction efficiency.

The carbon powder used for producing the above carbon composite bodies comprising a porous structure is preferably at least one (alone or combination of two or more kinds thereof) selected from the group consisting of highly oriented pyrolytic graphite (HOPG), kish graphite, natural graphite, artificial graphite, carbon nanotube and fullerene from the viewpoint of a further rise in the reaction efficiency.

A platinum-ruthenium (Pt—Ru) catalyst, an iridium-ruthenium (Ir—Ru) catalyst and a platinum-tin (Pt—Sn) catalyst are formed on the outer surface of the fuel electrode body 31 by a method in which a solution containing the above metal ions or a metal fine particle precursor such as metal complexes is subjected to impregnating and dipping treatments and then subjected to reducing treatment and an electrocrystallization method of metal fine particles.

The electrolyte layer 33 includes ion exchange membranes having proton conductivity or hydroxide ion conductivity, for example, fluorine base ion exchange membranes including Nafion (manufactured by Du Pont Co., Ltd.), and in addition thereto, it includes membranes in which heat resistance and inhibition in methanol crossover are good, for example, composite membranes comprising an inorganic compound as a proton conducting material and polymers as a membrane material, to be specific, composite membranes using zeolite as the inorganic compound and styrene-butadiene base rubber as the polymer, hydrocarbon base graft membranes and the like.

The air electrode layer 34 includes porous carbonaceous bodies on which platinum (Pt), palladium (Pd) and rhodium (Rh) are carried by a method using a solution containing the metal fine particle precursor described above and which comprise a porous structure.

The fuel supplying member 40 described above shall not specifically be restricted as long as it has a penetrating structure in which it can be inserted into the valve 12 of the fuel discharge part 11 in the fuel reservoir A to supply the liquid fuel to the respective unit cells 30, and it includes, for example, those comprising porous bodies having capillary force which are constituted from felts, sponges, sintered bodies such as resin particle-sintered bodies and resin fiber-sintered bodies and fiber bundles comprising one or combination of two or more kinds of natural fibers, animal fibers, polyacetal base resins, acryl base resins, polyester base resins, polyamide base resins, polyurethane base resins, polyolefin base resins, polyvinyl base resins, polycarbonate base resins, polyether base resins and polyphenylene base resins. A porosity of the above porous bodies and fiber bundles is suitably set according to a supplying amount of the liquid fuel to the respective unit cells 30.

The used-fuel storing tank 50 is disposed at an end of the fuel-supplying member 40. In this case, it provides no problems to bring the used-fuel storing tank 50 into direct contact with the end of the fuel-supplying member 40 to occlude the used fuel directly in an occlusion body, and a sliver, a porous body or a fiber bundle may be provided as a feed at a junction brought into contact with the fuel-supplying member 40 to set it as a discharge passage for the used fuel.

The liquid fuel supplied by the fuel-supplying member 40 is used for reaction in the unit cell 30 of the fuel cell, and since a fuel supplying amount is linked with a fuel consuming amount, the liquid fuel which is discharged to the outside of the cell without reacting is scarcely found, so that a treating system is not required at a fuel outlet side as is the case with conventional liquid fuel type fuel cells. However, assumed is a structure in which when the fuel comes to be supplied in excess depending on an operation status, the liquid fuel which is not used for the reaction can be stored in the storing tank 50 to prevent inhibitory reaction.

A number 60 is a member comprising a mesh structure which joins the fuel reservoir A with the used-fuel storing tank 50 and which allows the liquid fuel to be surely supplied from the fuel cartridge directly to each of the respective unit cells 30 via the fuel-supplying member 40.

In the fuel cell prepared by using the fuel cartridge A thus constituted, the liquid fuel is supplied from the fuel reservoir A to the fuel supplying member 40 inserted into the valve 12 in the fuel discharge part 11 which is a fuel supplying part or the fuel electrode member 31 having a penetrating structure, and the liquid fuel is introduced into the unit cells 30 by any penetrating structure.

In the present invention, the fuel cartridge A detachably connected with the fuel cell main body is equipped with the fuel-storing vessel 10 for storing the liquid fuel F, the fuel discharge part 11 and the follower 20 which seals the liquid fuel and moves as the liquid fuel is consumed at a rear end part of the liquid fuel F; the follower 20 comprises the follower auxiliary member 21 which has no fluidity and is insoluble in the liquid fuel and the cap member 22 which has no fluidity and is insoluble in the liquid fuel, and the follower 20 assumes a constitution in which it is interposed between the follower auxiliary member 21 at the lower part and the cap member 22 at the upper face. Thus, the follower auxiliary member 21 and the cap member 22 allow the follower 20 to move as the fuel is consumed with power generation by the fuel cell to meet reduction in a volume of the liquid fuel, and when the fuel reservoir (liquid fuel) is heated by operation of the fuel cell, an expansion in a volume thereof can be met as well by moving of the follower 20 described above. In addition thereto, even when heavy vibration is exerted onto the fuel cartridge, a constitution in which the follower 20 is interposed between the follower auxiliary member 21 and the cap member 22 makes it possible to prevent the follower 20 from being deformed and separating and makes it possible to stably supply the liquid fuel directly to the fuel cell main body N. In particular, provided is the fuel cartridge in which even when a volume of the liquid fuel is big and a cartridge diameter is large, the liquid fuel can stably be supplied directly to the fuel cell main body and which has excellent vibration resistance. Further, provided is the fuel cartridge for a fuel cell in which the liquid fuel is not lost in storage and which can reduce a size of the fuel cell.

The follower 20 assumes a constitution in which it is interposed between the follower auxiliary member 21 and the cap member 22 which have a cross-sectional area of 50% or more based on a cross-sectional area of the fuel-storing vessel 10 in a diameter direction, and it is excellent in vibration resistance and can follow well without causing discontinuity of following even when used is the fuel cell having a large consuming speed of the fuel or the fuel cell having a fuel-storing vessel of a tube type having a large diameter in order to load a large amount of the liquid fuel.

In the embodiment described above, the valve 12 for sealing communication between the inside and the outside of the fuel-storing vessel 10 is installed in the fuel discharge part 11. That is, the liquid fuel supplying member 40 is inserted into the valve 12, whereby the fuel-storing vessel 10 is communicated between the inside and the outside to form a communicating part 13 for supplying the liquid fuel F in the inside of the fuel-storing vessel 10 to the outside. When the valve 12 is installed in the fuel discharge part 11, the valve 12 is compressed to an axis direction by an outer edge part 14 of the valve, whereby compressing force is allowed to work on the communicating part 13, so that the liquid fuel F can more effectively be prevented from leaking from the communicating part 13. Also, the fuel-storing vessel 10 is provided with an adaptor 16 to assume a structure in which the valve 12 is interposed between a stopper part 16a and a fixing member 16c in the adaptor 16, so that assembling is facilitated, and the valve 12 can stably be fixed in the inside of the fuel discharge part 11 equipped to the storing vessel 10.

The fuel-storing vessel is not substituted with air as the fuel is discharged, and therefore even if the fuel discharge part is turned upward in a state in which the fuel is discharged to some extent, the fuel can be discharged well since the fuel is always brought into contact with the fuel discharge part.

Further, in the embodiment described above, capillary force is present at least in the fuel electrode body 31 and/or the fuel supplying member 40 brought into contact with the fuel electrode body 31, and this capillary force makes it possible to supply stably and continuously the fuel directly from the fuel storing tank 10 to each of the unit cells 30 without bringing about back flow and interruption. More preferably, setting capillary force of the used-fuel storing tank 50 larger than capillary force of the fuel electrode body 31 and/or the fuel supplying member 40 brought into contact with the fuel electrode body 31 makes it possible to flow stably and continuously the liquid fuel from the fuel storing tank 10 and the respective unit cells 30 directly to the used-fuel storing tank without bringing about back flow and interruption.

Further, the above fuel cell assumes a structure in which the liquid fuel can smoothly be supplied as it is without being vaporized and without using specifically auxiliary appliances such as a pump, a blower, a fuel carburetor, a condenser and the like, and therefore it becomes possible to reduce a size of the fuel cell.

Accordingly, in the fuel cell which is excellent in vibration resistance in the above embodiment, it becomes possible to turn the whole part of the fuel cell into a cartridge, and provided is the small-sized fuel cell which can be used as an electric power source for portable electronic appliances such as cellular phones, note type personal computers and the like.

In the embodiment described above, a structure in which two unit cells 30 are used has been shown, and a required electromotive force can be obtained by increasing the number of the unit cells 30 joined (serial or parallel) according to the use purposes of the fuel cell.

Figure 10:
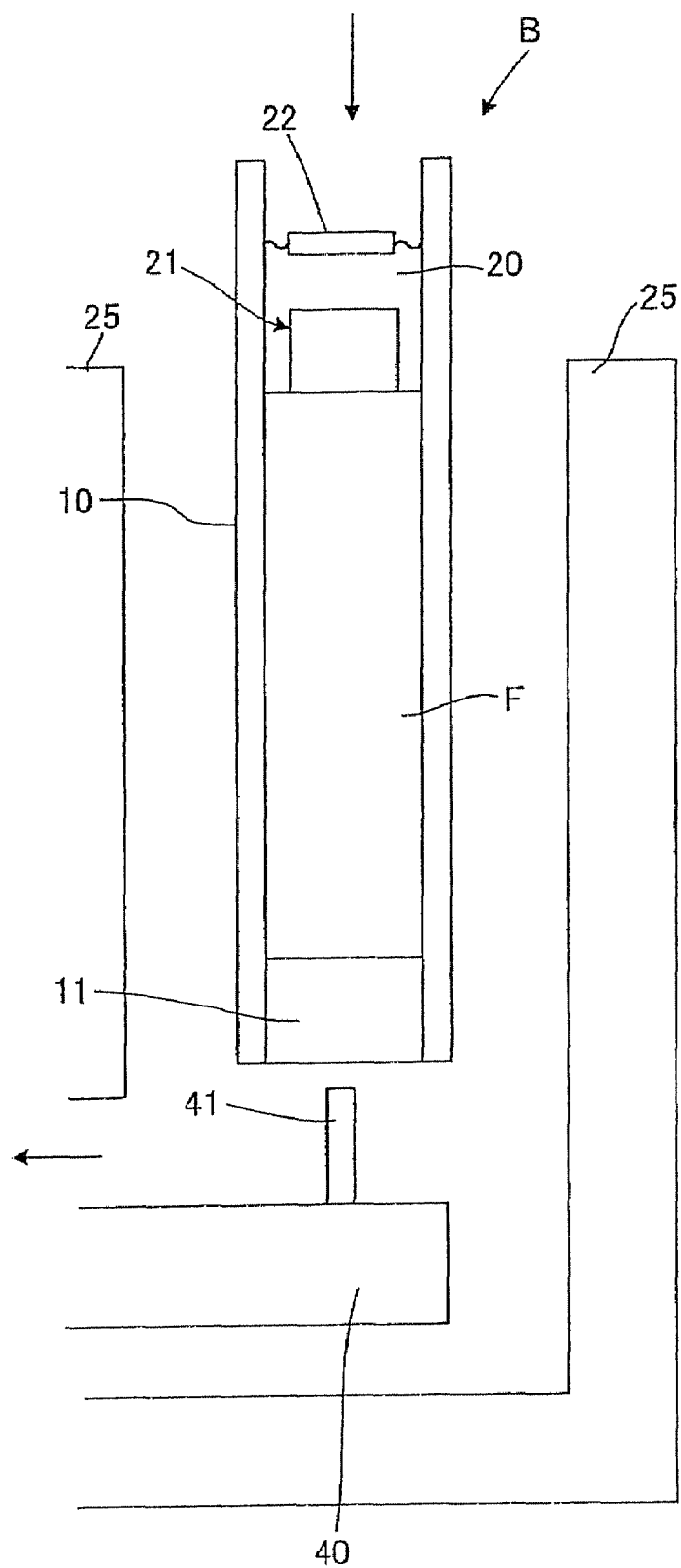
FIG. 10 is an outline cross-sectional drawing showing in a vertical cross-sectional embodiment, a state before the fuel cartridge according to the present invention is installed in the fuel cell main body.
Figure 11:
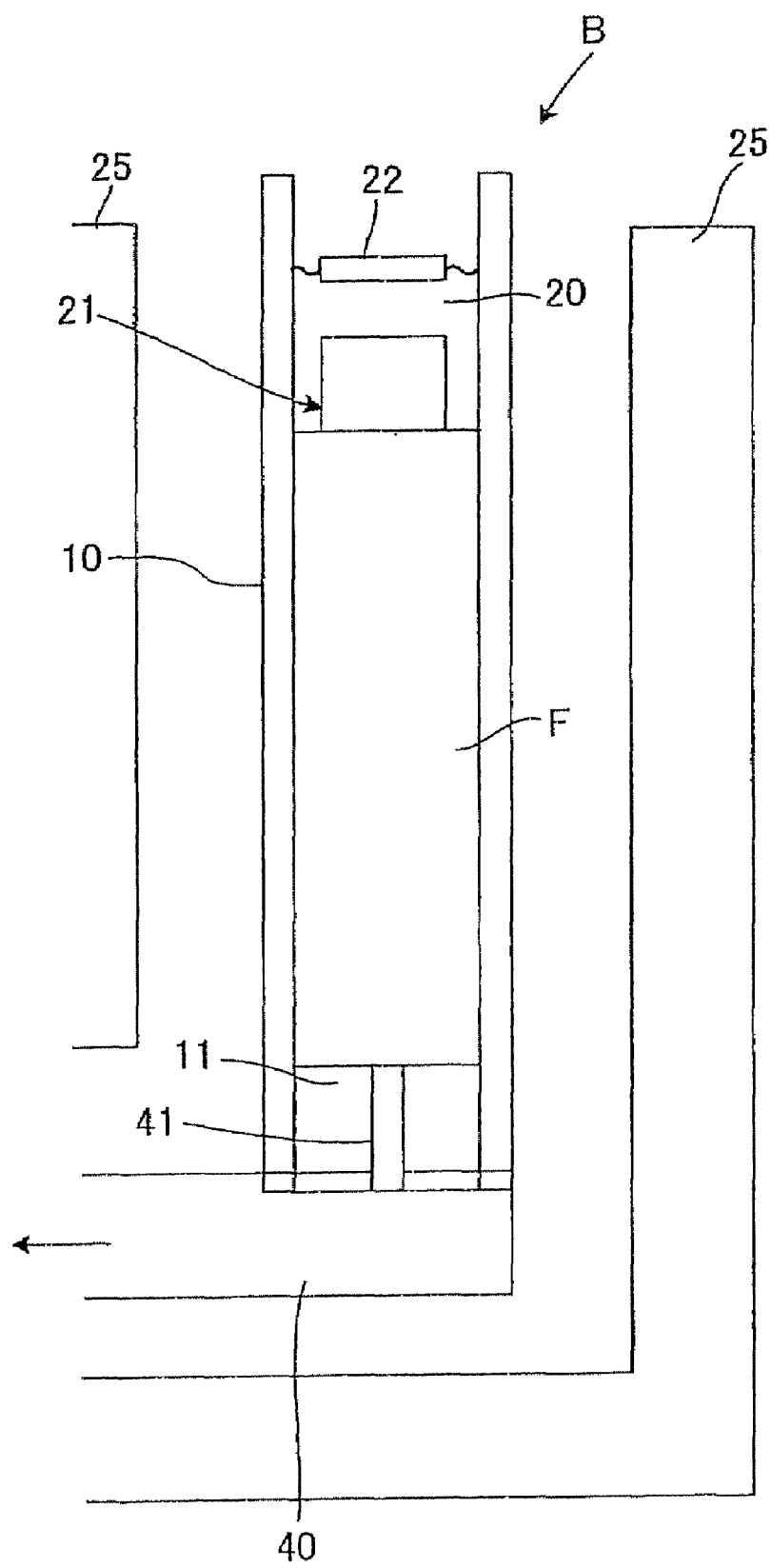
FIG. 11 is an outline cross-sectional drawing showing in a vertical cross-sectional embodiment, a state in which the fuel cartridge according to the present invention is installed in the fuel cell main body.

FIG. 10 and FIG. 11 show another embodiment of connection with the fuel cell main body. In the following embodiment, the members having the same structure and the same effects as those of the fuel cell main body of the embodiment described above shall be given the same reference numerals as in FIG. 1 and FIG. 2, and the explanations thereof shall be omitted.

This embodiment is different from the embodiment described above in that a fuel cartridge is connected, as shown in FIG. 10 and FIG. 11, with a fuel supplying member 40 via a fuel-supplying tube 41 inserted into a valve in a fuel discharge part 11.

Assumed is, though not illustrated, a structure in which a tip of the fuel supplying member 40 (an arrow direction in FIG. 10 and FIG. 11) is joined in series or in parallel with fuel-cell cells 30 as is the case with the first embodiment (FIG. 8) described above.

In the fuel cell of the above embodiment, a fuel cartridge B having visibility is equipped with a fuel-storing vessel 10 for storing a liquid fuel F, a fuel discharge part 11 having a valve 12 and a follower 20 which moves as the fuel is consumed, and the follower 20 is provided with a follower auxiliary member 21 and a cap member 22, whereby the liquid fuel in the inside of the cartridge structure can visually be observed as is the case with the first embodiment described above. Accordingly, the use state of the fuel can visually be observed with ease, and the follower 20, the follower auxiliary member 21 and the cap member 22 allow the follower 20 to move without causing discontinuity of following even when used is the fuel cell having a large consuming speed of the fuel or the fuel cell having the fuel-storing vessel of a tube type having a large diameter, whereby reduction in a volume of the liquid fuel is met. In addition thereto, when the liquid fuel is heated by operation of the fuel cell, the follower 20 moves to follow expansion in a volume of the fuel. The follower 20 can be supported by the follower auxiliary member 21 and the cap member 22, so that the vibration resistance is improved, and falling of the follower 20, spilling out of the liquid fuel brought about by the falling and coming in of the air can be prevented. This prevents the liquid fuel from being lost in storage, and capillary force of the fuel supplying member 40 makes it possible to supply the liquid fuel stably and continuously from the fuel-storing vessel 10 directly to each of the unit cells without causing back flow and interruption.

Figure 12:
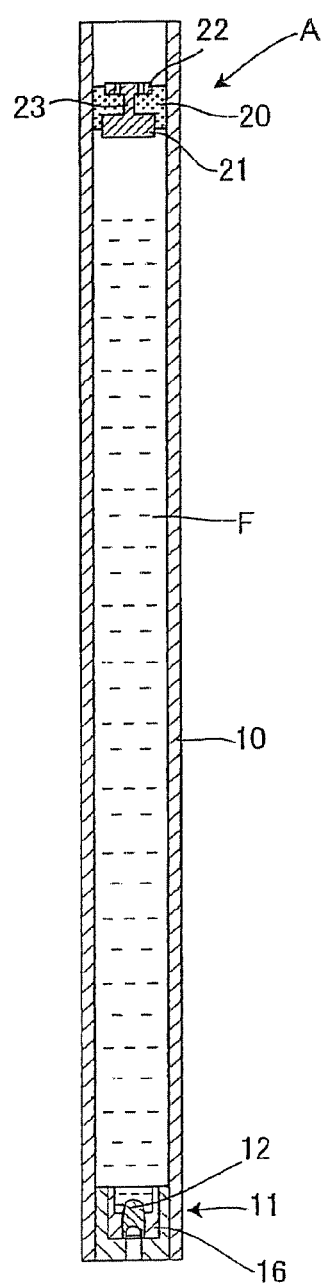
FIG. 12 (a) is an outline cross-sectional drawing showing in a vertical cross-sectional embodiment, a fuel cartridge which is another example of the embodiment according to the present invention, and FIGS. 12 (b) to (d) are a front view, a plan view and a perspective drawing showing the follower auxiliary member, the cap member and the connecting member.
Figure 12:
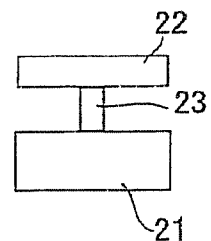
Figure 12:
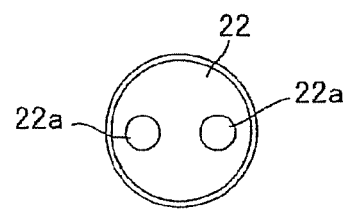
Figure 12:
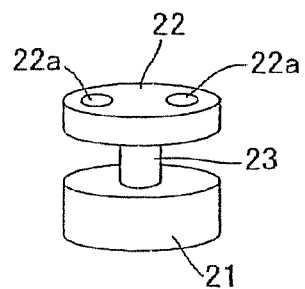

FIGS. 12 (a) to (d) show another embodiment of the fuel cartridge.

This embodiment is different from the embodiment described above only in that the fuel cartridge A is different from that shown in FIGS. 1 (a) and (b) and FIGS. 2 (a) to (h) in that a follower auxiliary member 21 and a cap member 22 are connected by a connecting member 23. The same constitution as that of the fuel cartridge A shall be shown by the same reference numerals, and the explanations thereof shall be omitted.

In the above embodiment, assumed is a constitution in which the follower auxiliary member 21 and the cap member 22 are connected, as shown in FIGS. 12 (a) to (d), by the connecting member 23 at a fixed interval (preferably a range of Z described before), and therefore movement of a follower 20 can be eliminated in a fixed space, so that falling of the follower 20, spilling out of a liquid fuel brought about by the falling and coming in of the air can be prevented further more. This further prevents the liquid fuel from being lost in storage, and capillary force of a fuel supplying member makes it possible to supply the liquid fuel stably and continuously from a fuel-storing vessel 10 directly to each of the unit cells without causing back flow and interruption. In particular, when a length of a connected body of the follower auxiliary member 21 and the cap member 22 in a longitudinal direction of the fuel cartridge A is longer than a length of the inner diameter of the fuel-storing vessel 10, the follower 20 is not turned over in the fuel-storing vessel 10, and therefore the shape of the follower 20 can be prevented from being damaged by turning over.

The connecting member 23 is constituted as well of a material which is insoluble in the liquid fuel or slightly volatile, and it may comprise a material which is the same as or different from those of the follower auxiliary member 21 and the cap member 22. The connected structure can be formed by integrally molding the follower auxiliary member 21, the cap member 22 and the connecting member 23 or by firmly fixing the follower auxiliary member 21 and the cap member 22 with the connecting member 23 by engaging or joining to integrate.

Further, when integrally molding the follower auxiliary member 21, the cap member 22 and the connecting member 23, the molded article may be a dense body, but it may be a hollow body or can be constituted of a porous body. When integrally molding them, the molded article is advantageously and preferably constituted of a porous body in terms of performances. On the other hand, when integrated by firmly fixing by engaging or joining, the respective members can suitably be selected from a hollow structure and porous bodies, and it is possible as well to combine the respective members having different constitutions.

Figure 13:
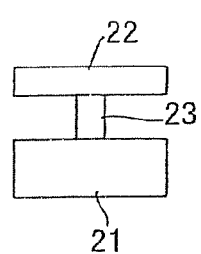
FIGS. 13 (a) to (c) are a front view, a plan view and a perspective drawing which show another embodiment of the follower auxiliary member, the cap member and the connecting member.
Figure 13:
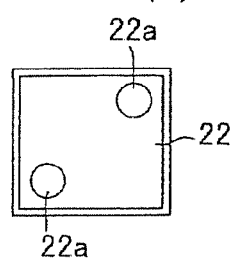
Figure 13:
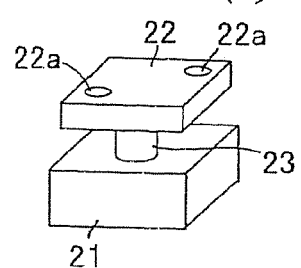
Figure 14:
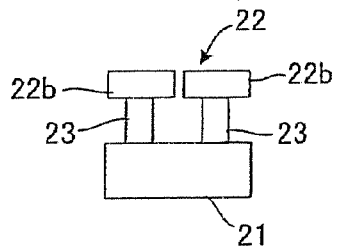
FIGS. 14 (a) to (c) are a front view, a plan view and a perspective drawing which show another embodiment of the follower auxiliary member, the cap member and the connecting member.
Figure 14:
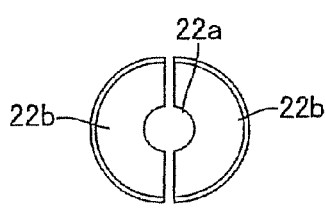
Figure 14:
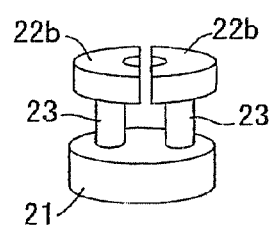
Figure 15:
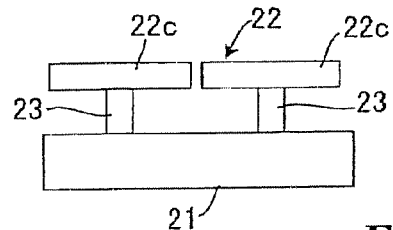
FIGS. 15 (a) to (c) are a front view, a plan view and a perspective drawing which show another embodiment of the follower auxiliary member, the cap member and the connecting member.
Figure 15:
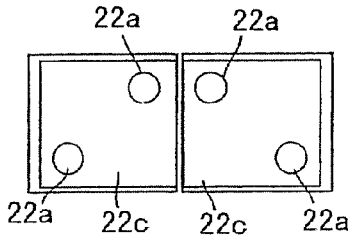
Figure 15:
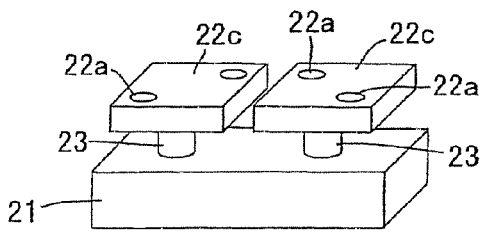
Figure 16:
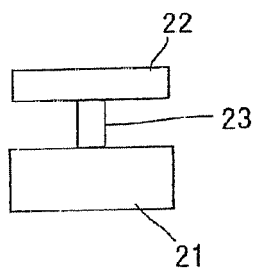
FIGS. 16 (a) to (c) are a front view, a plan view and a perspective drawing which show another embodiment of the follower auxiliary member, the cap member and the connecting member.
Figure 16:
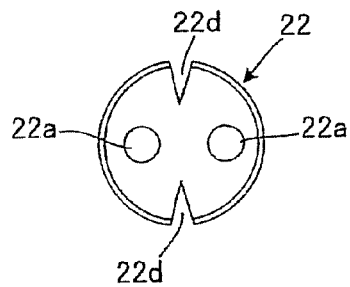
Figure 16:
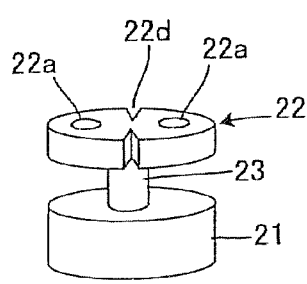
Figure 17:
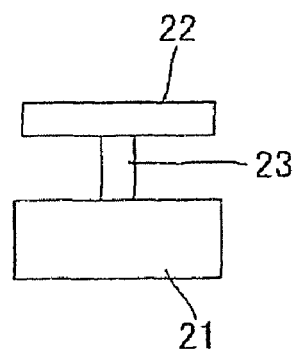
FIGS. 17 (a) to (c) are a front view, a plan view and a perspective drawing which show another embodiment of the follower auxiliary member, the cap member and the connecting member.
Figure 17:
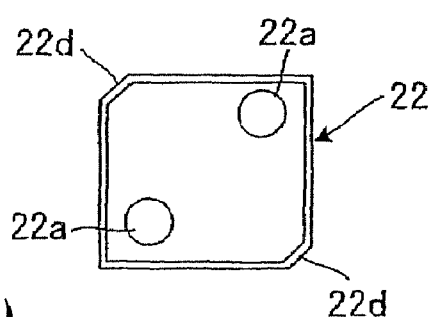
Figure 17:
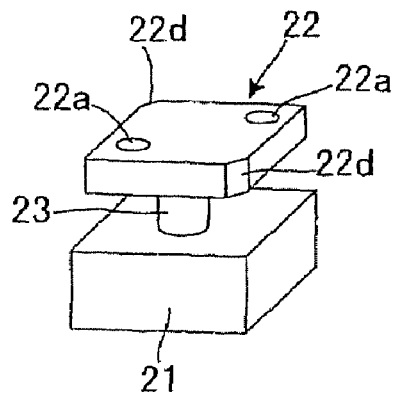

FIGS. 13 (a) to (c) to FIGS. 17 (a) to (c) show other various structures in which a follower auxiliary member 21 and a cap member 22 are integrated by a connecting member 23, wherein FIG. 3 (a), FIG. 4 (a), FIG. 5 (a), FIG. 6 (a) and FIG. 7 (a) show a front view; FIG. 3 (b), FIG. 4 (b), FIG. 5 (b), FIG. 6 (b) and FIG. 7 (b) show a plan view; and FIG. 3 (c), FIG. 4 (c), FIG. 5 (c), FIG. 6 (c) and FIG. 7 (c) show a perspective drawing.

These structures shown in FIGS. 13 (a) to (c) to FIGS. 17 (a) to (c) are different in that the follower auxiliary member 21 and the cap member 22 in FIGS. 3 (a) to (c) to FIGS. 7 (a) to (c) are integrated by the connecting member 23. The same constitutions as in FIGS. 3 (a) to (c) to FIGS. 7 (a) to (c) shall be shown by the same reference numerals, and the explanations thereof shall be omitted.

Even the above embodiment in which the follower auxiliary member 21 and the cap member 22 are integrated by the connecting member 23 can be performed in the same manner as in FIGS. 12 (a) to (d), and the same actions and effects are exhibited.

The fuel cartridge A of the present invention shall not be restricted to the respective embodiments described above and can be varied to various extents within the scope of the technical concept of the present invention.

For example, the unit cell 30 having a cylindrical shape is used, but it may have other shapes such as a prismatic shape and a tabular shape. It may be connected with the fuel supplying member 30 in parallel as well as in series.

In the embodiment described above, the check valve 11 shown in FIGS. 2 (a) to (d) is used as a fuel discharge part, but it shall not specifically be restricted thereto as long as it assumes a structure in which foreign matters such as air are prevented from coming in the liquid fuel F stored directly in the fuel-storing vessel 10 from the periphery of the fuel-supplying tube 41 and the liquid fuel can be supplied to the fuel supplying member 40 inserted thereto. It may be, for example, a valve member equipped with a spring member.

Further, in the embodiment described above, the present invention has been explained as a direct methanol fuel cell, but the present invention shall not be restricted to a direct methanol fuel cell described above as long as the fuel cartridge detachably connected with the fuel cell main body is equipped with the fuel-storing vessel for storing the liquid fuel, the fuel discharge part and the follower which seals the liquid fuel, the follower auxiliary member and the cap member which move as the liquid fuel is consumed at a rear end part of the liquid fuel and as long as the follower auxiliary member 21 and the cap member 22 are integrated by the connecting member 23, and it can suitably be applied as well to a fuel cell of a polymer membrane type including a reforming type. Further, when the fuel-storing vessel of a tube type is large in a diameter in a case where a big volume (for example, 100 ml or more) of the liquid fuel is loaded, an amount of the follower and a size of the follower auxiliary member are increased or enlarged in order to meet it, whereby the follower can follow well without causing discontinuity of following, and the follower which is excellent in vibration resistance can be prepared.

Further, the fuel cell main body is constituted by constructing an electrolyte layer comprising fine porous carbonaceous body on the outer surface of a fuel electrode body and constructing an air electrode layer on the outer surface of the electrolyte layer, but the structure of the fuel cell main body shall not specifically be restricted and may be, for example, a fuel cell main body assuming a constitution in which a unit cell obtained by forming the respective layers of electrode/electrolyte/electrode on the surface of the base material which comprises a porous carbonaceous body having electric conductivity or a junction body obtained by joining two or more of the unit cells is provided and in which the base material is impregnated with a liquid fuel via a fuel supplying member and the surface of an electrode formed on the outer surface of the base material is exposed to air.

EXAMPLES

Next, the present invention shall be explained in further details with reference to examples and comparative example, but the present invention shall not be restricted to the examples described below.

Examples 1 to 2 and Comparative Example 1

Based on FIGS. 1 (*a*) and (*b*) and FIGS. 2 (*a*) to (*h*)

In Examples 1 to 2 and Comparative Example 1, structures shown below and a follower, a follower auxiliary member, a cap member, a connecting member and a liquid fuel cartridge filled with 2 g of a liquid fuel (70 wt % methanol solution, specific gravity: 0.87) were prepared respectively according to the following specifications. The respective fuel cartridges were vibrated at a frequency of 200 Hz and an amplitude of 1 mm at room temperature under the condition that the follower was turned downward, and the states of the respective fuel cartridges after 1 minute and 10 minutes were evaluated by the following evaluation criteria. The results thereof are shown in the following Table 2.
Constitution of fuel-storing vessel: tube
Tube: length: 100 mm, outer diameter: 5.4 mm, inner diameter: 4.0 mm, polypropylene-made extruded tube
Fuel discharge part (check valve, based on FIGS. 2 (*a*) to (*h*)): length: 5 mm, outer diameter: 4 mm, inner diameter: 1 mm, made of silicone rubber
Liquid fuel: 70 wt % methanol solution (specific gravity: 0.87)
Composition of Follower:
 A gelatinous follower (specific gravity: 1.0) having the following blend composition was used.

| | |
|---|---|
| Mineral oil: Nissan Polybutene 015N (MW = 580 manufactured by NOF CORPORATION) | 94 parts by weight |
| Hydrophobic silica: Aerosil R-974D (manufactured by Nippon Aerosil Co., Ltd., BET surface area: 200 m²/g) | 5 parts by weight |
| Silicone base surfactant: SILWET FZ-2171 (manufactured by Nippon Unicar Co., Ltd.) | 1 part by weight |

Follower Auxiliary Member (Based on FIGS. 1 (*a*) and (*b*)):
 Material: made of polypropylene, main body shape: cylindrical, outer diameter: 3 mm, length: 3 mm (50% based on the entire length of the follower), specific gravity: 0.5, cross-sectional area: 56% based on the cross-sectional area of the fuel-storing vessel 10 in a diameter direction
Cap Member (Based on FIGS. 1 (*a*) and (*b*)):
 Material: made of polypropylene, main body shape: circular, outer diameter: 3 mm, length: 1 mm, specific gravity: 0.5, cross-sectional area: 56% based on the cross-sectional area of the fuel-storing vessel 10 in a diameter direction, through hole: diameter 1 mm,
Connecting Member (Based on FIGS. 12 (*a*) to (*d*)):
 Material: made of polypropylene, main body shape: cylindrical, outer diameter: 1 mm, length: 5 mm (inserted into the follower auxiliary member and the cap member by every 1 mm, and therefore a distance between the follower auxiliary member and the cap member was 3 mm (a distance between the follower auxiliary member and the cap member accounted for 75% based on the inner diameter of the fuel-storing vessel 10)), specific gravity: 0.5

Example 1 was based on FIGS. 12 (*a*) to (*d*), and Example 2 was based on FIGS. 1 (*a*) and (*b*) (having no connecting part). Comparative Example 1 was constituted only from a follower auxiliary member.
Preparation Methods:
1) Example 1: a fuel discharge part 11 having a valve 12 was disposed at the lower end part of a fuel-storing vessel 10 of a tube type, and then a prescribed amount of a liquid fuel was filled thereinto from an aperture part at the upper end. Thereafter, a coupled follower auxiliary member (a follower auxiliary member 21+a connecting member 23+a cap member 22) was inserted, and then a follower was installed from a through hole 22*a*, followed by applying force of 300 G to a valve direction for 10 minutes by means of a centrifuge, whereby a fuel cartridge was prepared.
2) Example 2: the fuel discharge part 11 having the valve 12 was disposed at the lower end part of the fuel-storing vessel 10 of a tube type, and then a prescribed amount of the liquid fuel was filled thereinto from an aperture part at the upper end. Thereafter, the follower auxiliary member 21 and the cap member 22 were inserted, and then the follower was installed from the through hole 22*a*, followed by applying force of 300 G to a valve direction for 10 minutes by means of a centrifuge, whereby a fuel cartridge was prepared.
3) Comparative Example 1: the fuel discharge part 11 having the valve 12 was disposed at the lower end part of the fuel-storing vessel 10 of a tube type, and then a prescribed amount of the liquid fuel was filled thereinto from an aperture part at the upper end. Thereafter, the follower auxiliary member 21 was inserted, and then the follower was installed from the through hole 22*a*, followed by applying force of 300 G to a valve direction for 10 minutes by means of a centrifuge, whereby a fuel cartridge was prepared.

Evaluation Method of Vibration Resistance:

Vibration was applied for 1 minute and 10 minutes under the conditions described above to evaluate the state of the follower according to the following evaluation criteria.

Evaluation Criteria:
○: no deformation of follower and no leak of liquid fuel
Δ: a little deformation of follower and no leak of liquid fuel
x: deformation of follower and leak of liquid fuel were observed
xx: follower and liquid fuel were spilled out from fuel cartridge Evaluation Method of Discharge Property:

The liquid fuel was discharged at a rate of 0.5 ml/minute from the fuel discharge hole to evaluate a discharge property thereof by the following evaluation method.

Evaluation Criteria:
○: all filled fuel could be discharged
Δ: 80% or more of filled fuel could be discharged
x: discharge amount of fuel was 50% or less

TABLE 2

|  |  | Example 1 | Example 2 | Comparative Example 1 |
|---|---|---|---|---|
| Vibration resistance | 1 minute | ○ | ○ | X |
|  | 10 minutes | ○ | Δ | XX |
| Discharge property |  | ○ | ○ | ○ |

As apparent from the results shown in Table 2 described above, it was found that the vibration resistance and the discharge property were excellent in Examples 1 to 2 falling in the scope of the present invention as compared with Comparative Example 1 falling outside the scope of the present invention. To be specific, in Examples 1 to 2 and Comparative Example 1, the follower moved as the fuel was consumed, and the fuel could completely be consumed, but it was found that in a vibration resistance test, the follower was inferior in a vibration resistance in a case where it comprised only a follower auxiliary member as was the case with Comparative Example 1.

INDUSTRIAL APPLICABILITY

In the fuel cartridge of the present invention, the liquid fuel is not lost in storage, and the follower is prevented from being deformed and separating even when heavy vibration is exerted onto the fuel cartridge to make it possible to stably supply the liquid fuel directly to the fuel cell main body. In particular, even in a case in which a volume of the liquid fuel is big and the cartridge diameter is large, the liquid fuel can stably be supplied directly to the fuel cell main body, and therefore it can suitably be used for a small-sized fuel cell which is used as an electric power source for portable electronic appliances such as cellular phones, note type personal computers, PDA, digital cameras, electronic databooks and the like.

What is claimed is:

1. A fuel cartridge detachably connected with a fuel cell main body, wherein the fuel cartridge is equipped with a fuel-storing vessel for storing a liquid fuel, a fuel discharge part and a follower which seals the liquid fuel and moves as the liquid fuel is consumed at a rear end part of the liquid fuel; and the follower is provided with a follower auxiliary member which has no fluidity and is insoluble in the liquid fuel and a cap member which has no fluidity and is insoluble in the liquid fuel.

2. The fuel cartridge as described in claim 1, wherein the follower auxiliary member and the cap member are connected via a connecting member.

3. The fuel cartridge as described in claim 2, wherein the follower auxiliary member, the cap member and the connecting member comprise a material which is insoluble in the follower and the liquid fuel or a slightly volatile material.

4. The fuel cartridge as described in claim 1, wherein a distance between the follower auxiliary member and the cap member accounts for 50 to 200% of a diameter or a width of an inner face of the fuel-storing vessel.

5. The fuel cartridge as described in claim 1, wherein the follower comprises at least one selected from a liquid which is insoluble or slightly soluble in the liquid fuel and a gelatinous matter of the liquid.

6. The fuel cartridge as described in claim 5, wherein the insoluble or slightly soluble liquid comprises a non-volatile or slightly volatile organic solvent, and the gelatinous matter of the insoluble or slightly soluble liquid comprises a gelatinous matter containing the non-volatile or slightly volatile organic solvent and a thickener.

7. The fuel cartridge as described in claim 6, wherein the non-volatile or slightly volatile organic solvent is at least one selected from the group consisting of polybutene, mineral oils, silicone oils and liquid paraffins.

8. The fuel cartridge as described in claim 6, wherein the thickener is at least one selected from the group consisting of styrene base thermoplastic elastomers, vinyl chloride base thermoplastic elastomers, olefin base thermoplastic elastomers, polyamide base thermoplastic elastomers, polyester base thermoplastic elastomers, polyurethane base thermoplastic elastomers, calcium salts of phosphoric acid esters, fine particle silica and acetalkoxyaluminum dialkylates.

9. The fuel cartridge as described in claim 1, wherein the follower auxiliary member has a cross-sectional area of 50% or more based on a cross-sectional area of the fuel-storing vessel in a diameter direction.

10. The fuel cartridge as described in claim 1, wherein the cap member has a cross-sectional area of 50% or more based on a cross-sectional area of the fuel-storing vessel in a diameter direction.

11. The fuel cartridge as described in claim 1, wherein the follower auxiliary member has a cross-sectional figure which is similar to a cross-sectional figure of the fuel-storing vessel in a diameter direction.

12. The fuel cartridge as described in claim 1, wherein the cap member has a cross-sectional figure which is similar to a cross-sectional figure of the fuel-storing vessel in a diameter direction.

13. The fuel cartridge as described in claim 1, wherein the follower auxiliary member and/or the cap member comprise any of a solid matter, a hollow structure and a porous body.

14. The fuel cartridge as described in claim 1, wherein the cap member is provided with a through hole for installing the follower therethrough.

15. The fuel cartridge as described in claim 14, wherein the cap member is provided with an aperture for air release which is used for installing the follower therethrough.

16. The fuel cartridge as described in claim 1, wherein the liquid fuel is at least one selected from the group consisting of a methanol solution, an ethanol solution, dimethyl ether (DME), formic acid, hydrazine, an ammonia solution, ethylene glycol, a sodium boron hydride aqueous solution and a sucrose aqueous solution.

17. The fuel cartridge as described in claim 1, wherein a surface free energy of at least a wall face of the fuel-storing vessel which is brought into contact with the liquid fuel is controlled to a lower value than a surface free energy of the liquid fuel.

* * * * *